(12) United States Patent
Langer et al.

(10) Patent No.: US 7,597,405 B2
(45) Date of Patent: Oct. 6, 2009

(54) WHEEL BEARING JOINT UNIT

(75) Inventors: Roland Langer, Schwanfeld (DE);
Ernst Masur, Untereuerheim (DE); Ralf Heiss, Schweinfurt (DE); Benno Fueller, Karlstadt (DE); Peter Niebling, Bad Kissingen (DE)

(73) Assignee: Schaeffler KG, Herzogenaurach (DE)

( * ) Notice: Subject to any disclaimer, the term of this patent is extended or adjusted under 35 U.S.C. 154(b) by 0 days.

(21) Appl. No.: 11/912,008

(22) PCT Filed: Apr. 20, 2006

(86) PCT No.: PCT/DE2006/000684

§ 371 (c)(1),
(2), (4) Date: Oct. 19, 2007

(87) PCT Pub. No.: WO2006/111146

PCT Pub. Date: Oct. 26, 2006

(65) Prior Publication Data

US 2008/0185906 A1 Aug. 7, 2008

(30) Foreign Application Priority Data

Apr. 20, 2005 (DE) ................ 10 2005 018 126

(51) Int. Cl.
*F16D 3/84* (2006.01)

(52) U.S. Cl. .............. 301/105.1; 384/544; 384/562; 464/178

(58) Field of Classification Search ............ 301/105.1; 384/544, 542, 562; 464/178, 906
See application file for complete search history.

(56) References Cited

U.S. PATENT DOCUMENTS

| 2,317,070 | A | * | 4/1943 | Le Tourneau | 403/255 |
| 4,433,877 | A | * | 2/1984 | Colanzi | 384/544 |
| 4,460,058 | A | * | 7/1984 | Welschof et al. | 180/258 |
| 4,493,388 | A | * | 1/1985 | Welschof et al. | 180/258 |
| 4,576,503 | A | * | 3/1986 | Orain | 403/259 |
| 4,835,829 | A | * | 6/1989 | Welschof et al. | 29/894.361 |
| 4,966,473 | A | * | 10/1990 | Jacob | 384/477 |
| 5,052,979 | A | * | 10/1991 | Welschof et al. | 464/140 |
| 5,536,098 | A | * | 7/1996 | Schwarzler | 403/259 |
| 5,549,514 | A | * | 8/1996 | Welschof | 464/145 |
| 6,012,986 | A | * | 1/2000 | Guimbretiere | 464/178 |
| 6,022,275 | A | * | 2/2000 | Bertetti | 464/178 |

(Continued)

FOREIGN PATENT DOCUMENTS

DE     31 16 720 A    10/1982

(Continued)

*Primary Examiner*—Russell D Stormer
(74) *Attorney, Agent, or Firm*—Lucas & Mercanti, LLP

(57) ABSTRACT

The wheel bearing joint unit having an inner ring that sits on a hub of the wheel bearing joint unit. The inner ring is axially retained on the hub using a collar that is formed from the hub. The collar is provided with a toothing which meshes with a corresponding opposite toothing on a joint part. The toothing and the opposite toothing are braced against each other by a screw which rests on the hub and engages into a thread on the joint part. The joint has two axial projections, one which has the toothing to engage the toothing on the collar and another with the threading to engage the screw. These two projections are spaced apart by a groove to provide flexibility.

6 Claims, 3 Drawing Sheets

U.S. PATENT DOCUMENTS

| | | | |
|---|---|---|---|
| 6,550,975 B2 * | 4/2003 | Inoue et al. | 384/537 |
| 6,851,865 B2 * | 2/2005 | Nomura et al. | 384/544 |
| 6,918,637 B2 * | 7/2005 | Hahn | 301/105.1 |
| 7,118,182 B2 * | 10/2006 | Kayama et al. | 301/105.1 |
| 7,195,399 B2 * | 3/2007 | Myers et al. | 384/544 |
| 2004/0022471 A1 * | 2/2004 | Yamamoto | 384/544 |

FOREIGN PATENT DOCUMENTS

| | | |
|---|---|---|
| DE | 36 18 139 A | 12/1987 |
| DE | 36 36 243 A | 5/1988 |

* cited by examiner

WHEEL BEARING JOINT UNIT

FIELD OF THE INVENTION

A wheel bearing joint unit having at least one inner ring which is seated on a hub of the wheel bearing joint unit, with the inner ring being held axially on the hub by means of a collar which is formed out of the hub, and the collar having a toothing in engagement with a corresponding mating toothing on a joint component, and with the toothing and the mating toothing being braced against one another by means of at least one screw element which is supported on the hub and engages into a thread on the joint component.

BACKGROUND OF THE INVENTION

A wheel bearing joint unit of said type is described in DE 36 36 243 A1. The screw element is generally a bolt with a head and with a thread on a shank. The head of the bolt bears flat, in a screwed fashion, with a generally vertical planar contact face against a correspondingly vertical planar support face of the hub. The joint component is for example the bell of a constant-velocity joint. Formed in the base of the joint component or in a corresponding extension of the joint component is an internal thread.

During the assembly of the unit, the bolt is guided by means of the shank through a corresponding passage hole in the hub and screwed into the internal thread. The connection by means of the toothings is generally highly axially loaded by the screwing of the elements. The high forces lead to deformations in the screw connection.

The base of the joint component is therefore deformed in the direction of the head of the screw element. The deformations on the joint component under some circumstances adversely affect the position and shape of the joint component. Plastic or elastic deformations on the thread or on the surroundings of the thread are transmitted to the toothing and adversely affect the engagement.

During the screwing process, the head of the bolt is pulled into the passage hole axially in the direction of the thread. The planar contact face of the bolt on the support face is deformed into the shape of a "plate" and rises up from the support face on the flange. The bolt bears against the chamfer or edge which delimits the support face from the passage hole. As a result, the hub and the head are then in contact only by means of edge contact. The head is pulled in all the more the greater the radial spacing between the shank and the inner wall of the passage hole. Non-uniform distributions of stresses in the material of the screw connection and its surroundings can lead to a decrease in the axial preload and to damaging stress peaks in the connection. Dirt and water pass into the annular wedge between the contact face and support face.

SUMMARY OF THE INVENTION

It is therefore the object of the invention to create a wheel bearing joint unit with which the above-stated disadvantages are eliminated.

This object is achieved in that the rigid structure of the joint component radially between the thread and that part of the joint component on which the toothing, for example a helical or spur toothing, is formed, is interrupted by means of a groove. The groove extends from the direction of the head axially into the joint component. The toothing and at least the part of the joint component are separated from one another radially by the air gap of the groove, and merge into the material of the joint component only at the axial end of the groove.

The toothing is therefore decoupled from the thread in terms of the material transmission of elastic and/or plastic deformations. Deformations in the material of the section with the thread cannot continue, or can continue to a negligible extent, into the toothing on account of the radial separation of the thread and toothing. For this purpose, the joint component has, depending on the number of screw elements used, one or more extensions in which one or more threads are selectively formed. The extensions are preferably formed in one piece with the joint component and project on the joint component axially in the direction of the head of the respective screw element. Extension(s) project in the same axial direction from the joint part, which extensions have at least constituent parts of the mating toothing for the engagement into the toothing on the hub.

The arrangement is very compact and requires little axial installation space if the first extension with the internal thread extends axially into the hub at least to such an extent that at least the thread is surrounded radially by the toothing of the hub. In this case, the passage hole continuously has a diameter suitably sized for this purpose or is radially widened in the region into which the extension extends radially.

The first extension is preferably of annular design rotationally symmetrical with respect to the rotational axis of the wheel bearing joint unit. One embodiment provides that the first extension is at least partially delimited radially at the outside by the outer lateral surface of a truncated cone. The stress distribution from axial preload is thus optimized in the extension.

A further embodiment of the invention provides that the first extension and the second extension on the joint component jointly merge into a hollow channel which is formed at the end of the annular axial groove. The hollow channel is preferably rounded liberally with radii.

The object of the invention is also achieved by means of the features of an independent claim which relates to the design of the contact of the screw element against the hub or against at least one intermediate element which bears between the head and the hub. A combination of the previously described features with the features of the independent claim is also alternatively provided.

It is provided that the head of the screw element is preloaded axially against at least one support face which is inclined with respect to the rotational axis of the wheel bearing joint unit. According to the invention, the hub/the intermediate element—the intermediate element for example in the form of a disk—or the head of the screw element has a support face/contact face in the form of a draw-in face which—deviating from the vertical position—faces toward the rotational axis of the wheel bearing joint unit. The annular face is inclined with respect to a vertical plane or runs in a curved fashion out of said vertical plane. The vertical plane runs in the contact region between the head and support face/contact face. The support face/contact face is preferably described by the inner lateral surface/outer lateral surface of an internal truncated cone/external truncated cone and drawn into the passage hole from the end-side edge in the direction of the thread. Alternatively, both the contact face at the flange side and also the support face at the head side are provided with conical annular faces of said type, and correspond with one another.

In the case in which the support face is of conical design, the contact face is aligned vertically or is alternatively inclined in the opposite direction to the support face. The contact face is pre-loaded axially with respect to the rotational axis of the wheel bearing joint unit and is initially only in edge-contact with the latter under slight axial preload. With increasing tightening torque, the screw head is pulled into the passage hole. The contact face is deformed into the shape of a "plate" and nestles against the support face. Optimum contact in operation of the wheel bearing joint unit is ensured.

In the case in which the contact face is of conical design, the support face is aligned vertically or alternatively in the opposite direction to the contact face. The support face is preloaded axially against the contact face which is inclined with respect to the rotational axis, and is initially only in edge-contact with the latter under slight axial preload. With increasing torque, the screw head is pulled into the passage hole, with the contours on the flange and on the head nestling against one another.

DETAILED DESCRIPTION OF THE INVENTION

Figure 1:
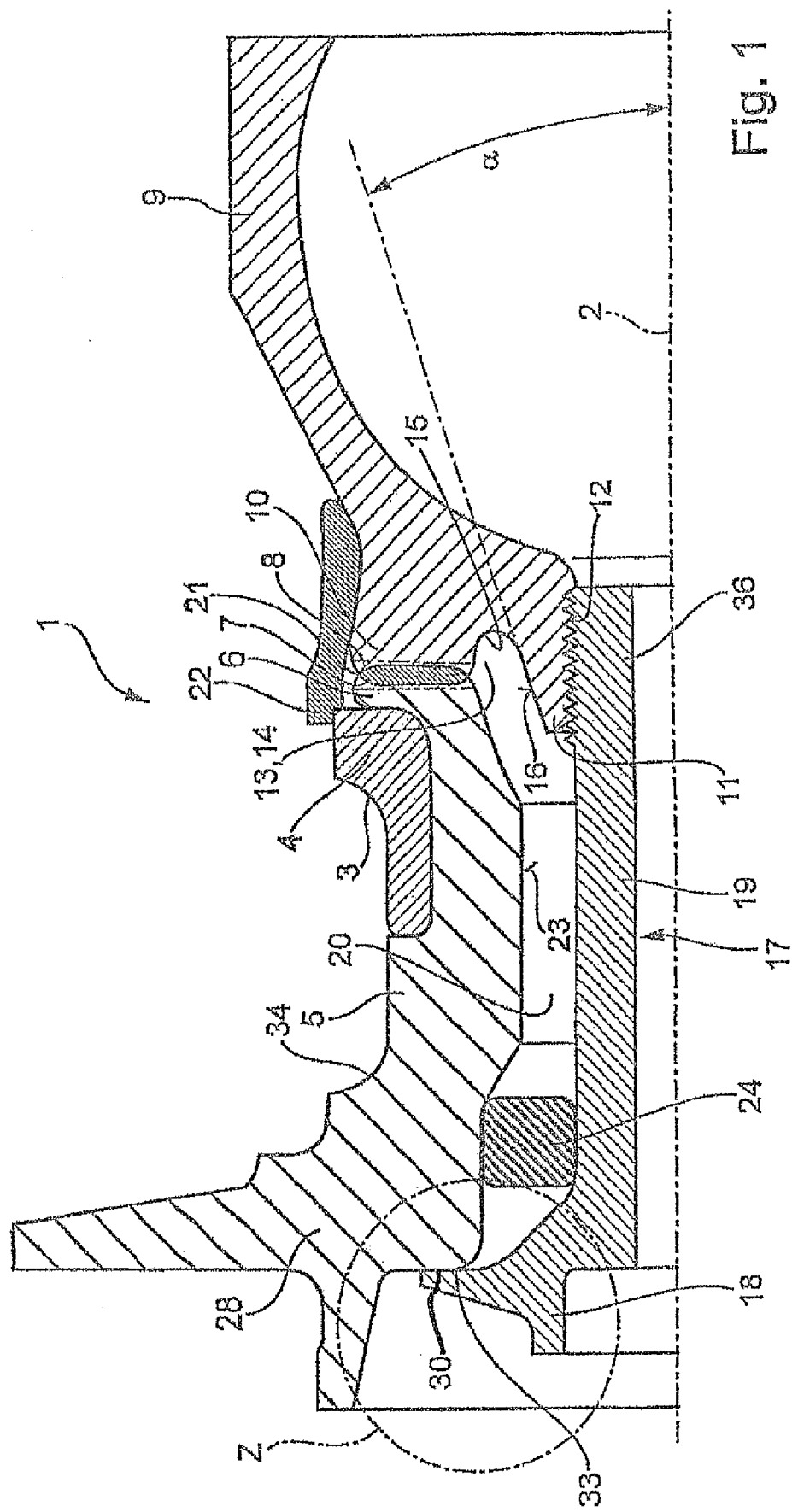
FIG. 1 is a sectional view of the present invention including a wheel bearing hub assembly with an axially fixed universal joint component.

The invention is explained in more detail below on the basis of exemplary embodiments. FIG. 1 shows a partial section through an exemplary embodiment of a wheel bearing joint unit 1 longitudinally along the rotational axis 2 of the wheel bearing unit 1. The wheel bearing unit 1 has two raceways 3 and 34 for rows of rolling bodies (not illustrated). One raceway 3 is formed on an inner ring 4. The inner ring 4 is seated radially on a hub 5 of the wheel bearing joint unit 1. The inner ring 4 is held axially on the hub 5 by means of a collar 6. Formed on the collar 6 is a spur toothing 7 (not described in any more detail). The spur toothing 7 engages into a mating toothing 8 on a joint component 9 in the form of a joint bell. The mating toothing 8 is formed on an extension 10 which projects axially from the joint bell. A further extension 11 with an internal thread 12 is formed on the joint component 9.

The two extensions 10 and 11 are of annular design and rotationally symmetrical. The extension 10 with the mating toothing 8 surrounds the extension 11 and, at the mating toothing 8, is separated from the extension 11 radially by an air gap 13. The air gap 13 is formed in an axial groove 14. The axial groove 14, in a channel 15, is rounded with a radius.

The extension 11 has an externally conical contour 16 which is inclined with respect to the rotational axis 2 by the acute angle α. A screw element 17 in the form of a bolt 36 is screwed into the extension 11. The hub 5 and the joint component 9 are clamped axially by means of the screw element 17 in the internal thread 12. For this purpose, the bolt 36 bears with the head 18 at the end side in this case directly against the hub 5, and extends with the shank 19 through the passage hole 20 axially into the extension 11.

Figure 3:
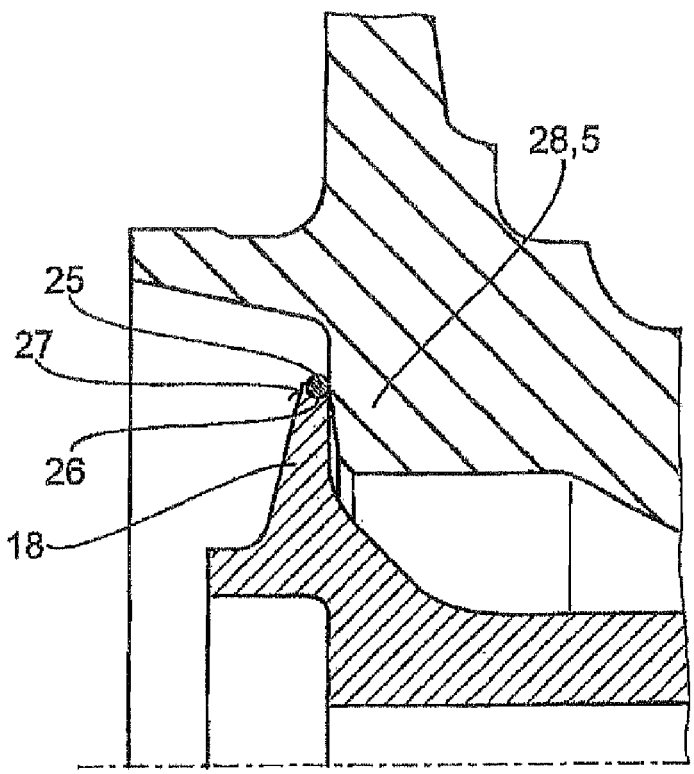
FIG. 3 is a sectional view that illustrates a further embodiment of the sealing and screw connection of Detail Z from FIG. 1.
Figure 4:
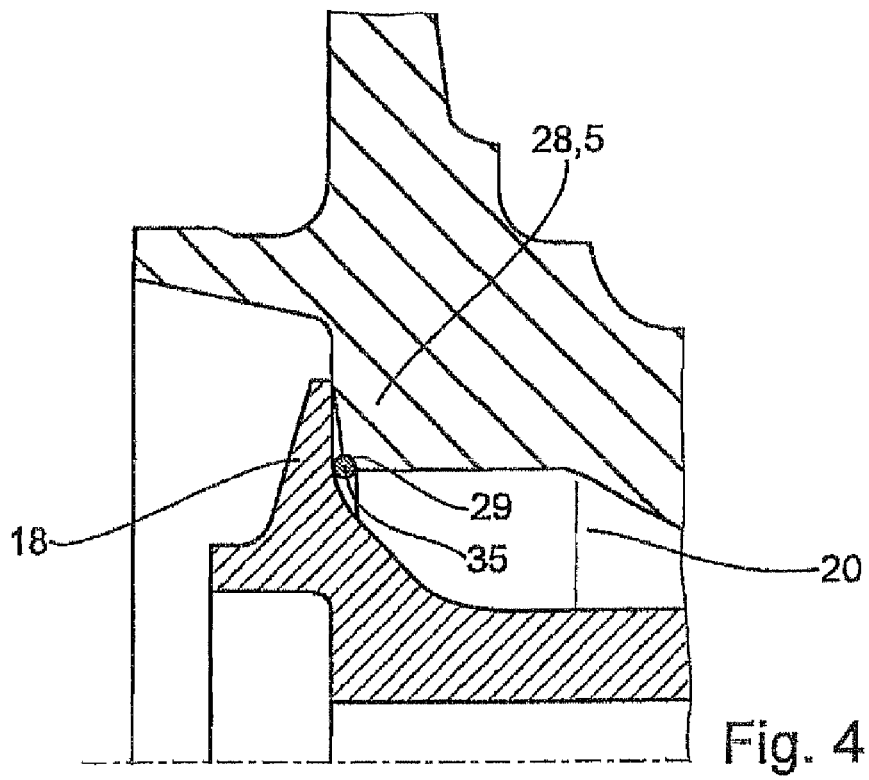
FIG. 4 is a sectional view that illustrates a further embodiment of the sealing and screw connection of Detail Z from FIG. 1.

The joint 21 between the joint component 9 and the collar 6 is covered radially at the outside by means of a plastic covering ring 22. The covering ring 22 prevents the penetration of moisture and dirt into the joint 21. Alternatively or at the same time, an elastic or hardening sealing means, for example a sealing paste, is introduced into the joint during assembly. A sealing ring 24 is clamped in the passage hole 20 radially between the shank 19 and the inner wall 23. FIGS. 3 and 4 describe further embodiments of seals of the screw connection. FIGS. 3 and 4 show alternative designs of the detail Z from FIG. 1, enlarged and not to scale. FIG. 3 shows an O-ring 25 in a clam-ping groove 26 between the edge 27 of the head 18 and the flange 28 on the hub 5. In the illustration of FIG. 4, an O-ring 35 is clamped axially between the head 18 and the edge 29 to the passage hole 20. It is also conceivable that elastic sealing elements such as O-rings or sealing pastes are integrated in the screw connection between the threads, and that sealing pastes or other sealing means are applied in the contact region between the head and the flange.

Figure 2:
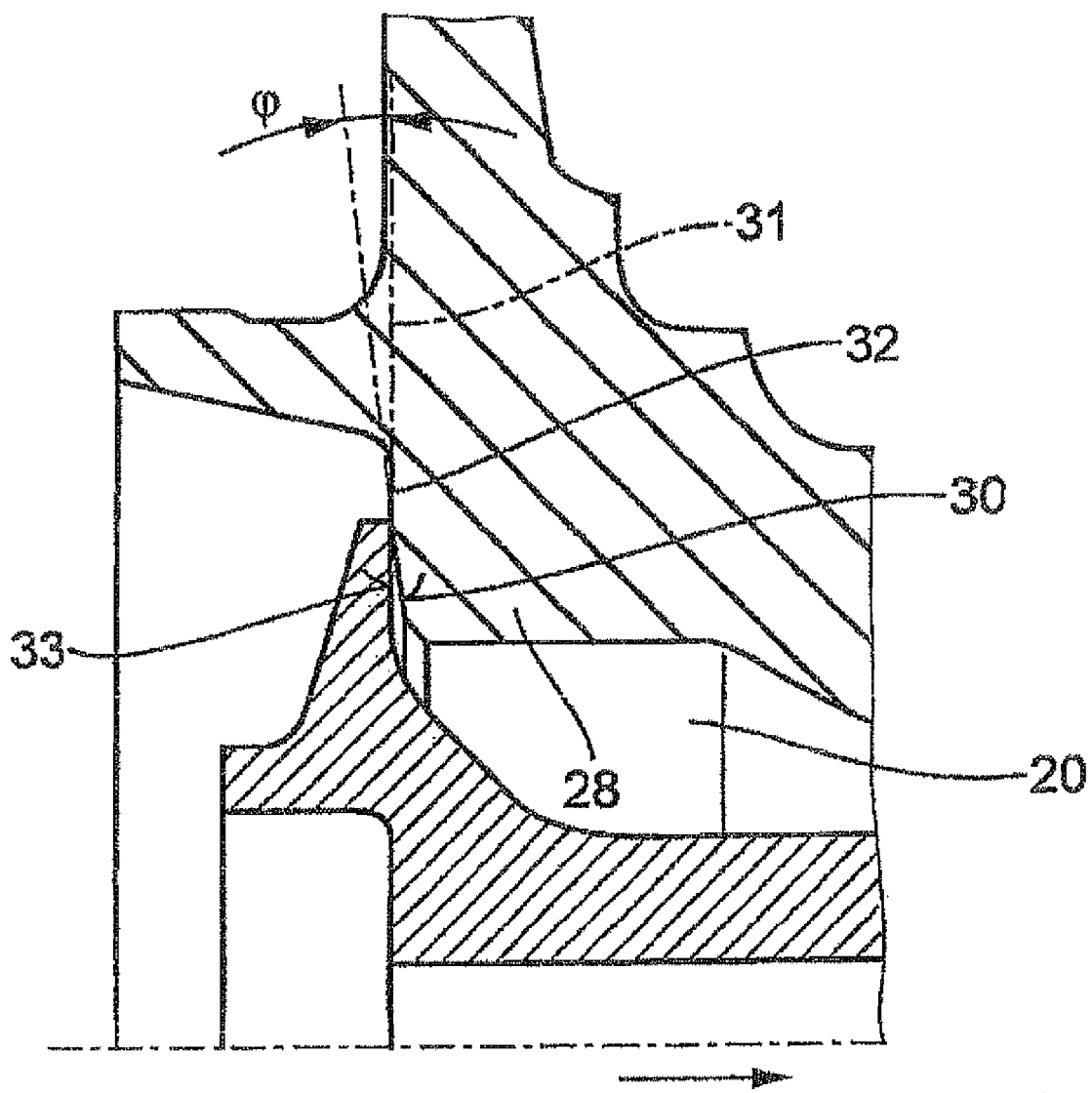
FIG. 2 is a sectional view illustrating the interaction of the support face of a bolt and the contact face of the wheel bearing hub.

FIG. 2 shows the detail Z from FIG. 1, enlarged and not to scale. An end-side face 30, in this case the support face 30, is inclined counterclockwise with respect to an imaginary vertical plane 31 by the angle φ, and is thus designed so as to be drawn into the passage hole 20 in the axial direction, denoted by the arrow, toward the inner thread 12, proceeding from the end side 32 of the flange 28. The contact face 33 on the head 18 lies in this case in the vertical plane 31. It is also conceivable for the contact face to be inclined and for the support face to lie in the vertical plane.

In the case of high axial preload, the contact face 33 is deformed into the shape of a "plate", that is to say the contact face 33 is, at its smallest diameter, pulled axially in the direction of the arrow into the passage hole 20. In the event of axial preload, the contact face 33 then no longer lies in the vertical plane 31 but rather is inclined with respect thereto approximately by the angle φ.

LIST OF REFERENCE SYMBOLS

1 Wheel bearing joint unit
2 Rotational axis
3 Raceway
Inner ring
Hub
Collar
Toothing
Mating toothing
Joint component
Extension
Extension
Internal thread
Air gap
Axial groove
Channel
Contour
Screw element
Head
Shank
Passage hole
Joint
Covering ring
Inner wall
Sealing ring
25 O-ring
26 Clamping groove
27 Edge
28 Flange
29 Edge
30 Support face
31 Vertical plane
32 End side
33 Contact face

34 Raceway
35 O-ring
36 Bolt

The invention claimed is:

1. A wheel bearing joint unit comprising: at least one inner ring which is seated on a hub of the wheel bearing joint unit, the inner ring being held axially on the hub by means of a collar which is formed out of the hub, and the collar having a toothing in engagement with a corresponding mating toothing on a joint component, and with the toothing and the mating toothing being braced against one another by means of a screw element which is supported on the hub and engages into internal threads on the joint component, wherein a first axially projecting extension is formed on the joint component, with the first extension having the internal threads and a second axially projecting extension is formed on the joint component, with the second extension projecting axially in the same direction as the first extension, the first extension and the second extension are formed in a materially integral fashion with the joint component, and an axial groove formed in the joint component, the groove positioned radially between the first extension and the second extension so as to radially separate the mating toothing from the first extension.

2. The wheel bearing joint unit as claimed in claim 1, wherein the first extension extends axially into the hub at least to such an extent that at least the internal thread is surrounded radially by the toothing.

3. The wheel bearing joint unit as claimed in claim 1, wherein the first extension has an annular design and surrounds the rotational axis of the wheel bearing joint unit, with the first extension delimited radially by an outer lateral surface of a truncated cone.

4. The wheel bearing joint unit as claimed in claim 1, wherein the screw element is supported with the head on the hub, and the head is preloaded axially against one support face which is inclined with respect to the rotational axis of the wheel bearing joint unit.

5. The wheel bearing joint unit as claimed in claim 4, wherein the support face has a cross-sectional shape of an internal cone.

6. The wheel bearing joint unit as claimed in claim 5, wherein the support face, is drawn axially towards the internal thread.

\* \* \* \* \*